US005582857A

United States Patent [19]
Bordeleau et al.

[11] Patent Number: 5,582,857
[45] Date of Patent: Dec. 10, 1996

[54] PRODUCT AND PROCESS OF MAKING A BEER HAVING INCREASED LIGHT STABILITY

[75] Inventors: Joseph R. L. Bordeleau; David J. Hastings; Michael J. McGarrity, all of London, Canada

[73] Assignee: Labatt Brewing Company Limited, London, Canada

[21] Appl. No.: 481,983

[22] Filed: Jun. 7, 1995

Related U.S. Application Data

[63] Continuation of Ser. No. 208,908, Mar. 11, 1994, abandoned, and a continuation of Ser. No. 003,516, Jan. 12, 1993, abandoned.

[51] Int. Cl.$^6$ .................................................. A23L 1/025
[52] U.S. Cl. ...................... 426/330.4; 426/248; 426/592; 426/600
[58] Field of Search ............................... 426/330.4, 248, 426/592, 600

[56] References Cited

U.S. PATENT DOCUMENTS

| | | | |
|---|---|---|---|
| 50,523 | 10/1966 | Wall | 426/248 |
| 1,582,677 | 4/1926 | Goodall | 250/46 |
| 1,811,869 | 6/1931 | Von Horvath et al. | 250/433 |
| 2,040,264 | 5/1936 | Mancini et al. | 99/277 |
| 2,452,968 | 11/1948 | Uihlein et all. | 426/248 |
| 2,740,049 | 3/1956 | Stein, Sr. | 250/48 |
| 3,037,116 | 5/1962 | Weber | 250/48 |
| 3,787,587 | 1/1974 | Weber | 426/248 |
| 4,389,421 | 6/1983 | Palamand | 426/330.4 |
| 5,218,079 | 6/1993 | Pawelek | 528/206 |
| 5,225,435 | 7/1993 | Pawelek | 514/415 |

FOREIGN PATENT DOCUMENTS 5182794  7/1973  Japan .

OTHER PUBLICATIONS

Shuso Sakuma, et al., "Sunstruck Flavor Formation in Beer," *American Society of Brewing Chemists, Inc.* (1991), 162–165.

Richard A. Larson, et al., "Flavin–Sensitized Photodecomposition of Anilines and Phenols," *Environmental Toxicology and Chemistry* 8 (May 1989), 1165–1170.

T. Toyosaki, et al., "Mechanism of Milk Riboflavin Photolysis in Model Systems," *Milchwissenschaft* 44(5) (1989), 292–295.

I. M. Tamer, et al., "Kinetics of Riboflavin Production by Brewers' Yeast," *Enzyme Microb. Technol.* 10 (Dec. 1988), 754–756.

H. Kamburou, et al., "A Method of Aimed Photoconversion of Riboflavin," *Comptes Rendus de l'Academie bulgare des Sciences* 41 (7) (1988), 43–46.

T. Toyosaki, et al., "Kinetics of Photolysis of Milk Riboflavin," *Milchwissenschaft* 43(3) (1988), 143–146.

N. Moll, "Reversed–Phase High Performance Liquid Chromatographic Determination of Riboflavin (Vitamin B2) In Alcoholic Beverges," *Frontiers of Flavor* (Presented Jul. 1987), 753–769.

E. M. Furuya, et al., "Effects of Water Activity, Light Intensity and Physical Structure of Food on the Kinetics of Riboflavin Photodegradation," *Journal of Food Science* 49 (1984), 525–528.

(List continued on next page.)

Primary Examiner—Helen Pratt
Attorney, Agent, or Firm—Levy, Zito & Grandinetti

[57] ABSTRACT

A process for the production of a hopped malt beer wherein a processing liquid containing riboflavin is hopped to form the desired beverage. The improvement comprises subjecting that processing liquid to an effective amount of actinic radiation of a wavelength adopted to decompose the riboflavin and thereby reduce the amount thereof, whereby a beer having enhanced light stability is obtained.

22 Claims, 4 Drawing Sheets

OTHER PUBLICATIONS

E. A. Woodcock, et al., "Riboflavin Photochemical Degradation in Pasta Measured by High Performance Liquid Chromatography," *Journal of Food Science* 47 (1982), 545–555.

O. W. Parks, et al., "Photodegradation of Riboflavin to Lumichrome in Milk Exposed to Sunlight," *Journal of Dairy Science* 60(7) (Received jan. 24, 1977), 1038–1041.

A. Sattar, et al., "Light–Induced Degradation of Vitamins I. Kinetic Studies on Riboflavin Decomposition in Solution," *Can. Inst. Food Sci. Technol. J.* 10 (1) (1977), 61–64.

William M. Moore, et al., "The Photochemistry of Riboflavin–V. The Photodegradation of Isoalloxazines in Alcoholic Solvents," *Photochemistry and Photobiology* 25 (1977), 347–356.

Chung Teck Shin, et al., "Effect of Certain Additives on the Photochemistry of Riboflavin," *Journal of Pharmaceutical Sciences* 59 (3) (Mar. 2970), 297–302.

G. E. Treadwell, et al., "Photochemical Degradation of Flavins," *Journal of Chromatography* 35 (1968). 376–388.

M. Verzele, et al., "p–Isohumulones," *State Univ. of Ghent* 73 (1967), 255–257.

Eddie C. Smith, et al., "The Photochemical Degradation of Riboflavin," *Iowa S. Univ. Dept. of Biochemistry and Biophysics* 85 (Oct. 20, 1963), 3285–3288.

Bertil Holmstrom, et al., "Riboflavin as an Electron Donor in Photochemical Reactions," *Polytechnic Institute of Brooklyn Dept. of Chem.* 83 (Apr. 20, 1961), 1867–1871.

Yoshiro Kuroiwa, et al., "The Role of Flavine Compounds in the Evolution of Hydrogen Sulfide in Beer on the Exposure to Sunlight," *Rep. Kirin Brew. Co.* 4 (1961), 20–34.

Gail B. Nickerson, "Quality Control of Flavors Introduced by Hops Better Bitter Beer," *Brewers Digest* (Jun. 1992), 24–26.

Fred Eckhardt, "In Search of the Elusive Sake Devil," *All About Beer* (Jun./Jul. 1991), 24–29.

P. F. Heelis, "The Photochemistry of Flavins," *Chemistry and Biochemistry of Flavoenzymes* 5 (1) (1991), 171–193.

1
PRODUCT AND PROCESS OF MAKING A BEER HAVING INCREASED LIGHT STABILITY

This application is a continuation of U.S. patent application Ser. Nos. 003,516 filed Jan. 12, 1993 and 08/208,908, filed Mar. 11, 1994 both now abandoned.

FIELD OF THE INVENTION

The present invention relates to hopped malt beverages, especially alcoholic brewery beverages produced at least in part from malt and in particular, to imparting thereto improved stability against light-induced off flavours.

BACKGROUND OF THE INVENTION

As is well known and accepted in the malt beverage brewing art, subjecting a hopped, especially alcoholic, malt brewery beverage, such as lager; ale, porter, stout and the like, (herein generically referred to as "beer"), to sunlight or artificial light, results in a significant deleterious effect on the sensory qualities of the beverage by generating the so-called "skunky" flavour which is sometimes also referred to as "sunstruck" or "light struck" flavour. It is believed that the sunstruck flavour is due to photochemical changes in the beverage which produce volatile sulphur-containing compounds. These sulphur compounds are thought to be formed at least in part by reaction of other sulphur-containing compounds with photochemically degraded hop components in the beverage and only very small amounts of these sulphur compounds are required to be present to impart the sunstruck flavour to the beverage and render it unacceptable. The photochemical reaction is assisted by the presence of riboflavin, one of several photo-initiators in the beverage, the riboflavin emanating mainly from the malt used in the production of beer and to a minor extent via the hops and, according to the common wisdom, the action of yeast during the fermentation (refer for example to "Kinetics of Riboflavin Production by Brewers Yeast" by Tamer et al. pages 754–756 Enzyme Microb Technology 1988 Vol 10 Dec.).

Attempts to prevent the beverages from becoming sunstruck involve enclosing the beer in cans or bottles made of protective, i.e. coloured glass, brown or amber being most efficient (refer for example to U.S. Pat. No. 2,452,968). These bottles reduce or eliminate the transmission to the beverage of light of wavelength shorter than about 560 nanometers, this light being most harmful since it assists the riboflavin in enhancing the production of the undesirable volatile sulphur compounds.

Another method developed to address the problem of "skunky" flavour production uses reduced isohumulones in place of hops or hop extracts, refer for example Verzele, M., et al., U. Inst. Brew. 73:255–257, 1967. Other methods involve adding light stabilizing materials to the beverage, see for example U.S. Pat. No. 4,389,421. However, in some jurisdictions, the use of such compounds have not been approved and further, many brewers are reluctant to use any additives and still use hops or hop extracts in attempting to achieve traditional beer flavour.

The problem of skunky flavour has been the subject of research for many years and such research continues, refer for example to the article "Sunstruck Flavour Formation in Beer" by Sakuma et al. ASBC Journal. This article also deals with the part believed played by riboflavin in the reaction of "skunky" flavour problem and suggests that removing riboflavin from the finished beer may solve the problem. However, an acceptable means for achieving that suggestion is clearly not readily apparent since the problem persists.

The most favourable context in which light is associated with malt beverages, is described in U.S. Pat. No. 3,787,587. That patent involves using an actinic light treatment on finished beer to accelerate the "aging" and "maturing" thereof. Moreover, sunlight or artificial light was used as early as 1865, refer U.S. Pat. No. 50,523, to treat the surface of boiling wort to decolorize it. The boiling wort, in keeping with typical brewery practices, would obviously have been hopped as well as being open to a highly oxygenated atmosphere during the boiling treatment. In both of these processes, it is almost a certainty that "skunky" beer flavour would ensue in the finished product. This is in keeping with what is well known in the art, about photochemical degradation in hopped malt beverages, and is in keeping with the general view that exposure of beer to light is anathema, and to be avoided at all costs in the interests of maintaining product shelf life.

It is also interesting to note that the literature teaches a process in which, sake, a unique Japanese fermented liquor or wine has been subjected to a light treatment—refer to Japanese published Patent Application 67667 entitled, "Process for Production of Sake Hardly Affected by Microbial Deterioration". This document teaches treating finished sake with light in the 200 to 700 micron range, the object being to have the light decompose riboflavin that is present in the finished sake, which riboflavin is an essential nutrient for lactic acid bacteria that is responsible for infectious spoilage in finished sake. As a consequence of the riboflavin destruction, the growth of the bacteria is inhibited and the sake preserved. Sake is, of course, a totally different product than beer, being an unhopped non-malt product, produced from rice using a starch-digestive enzyme amylase obtained from a mold and a special sake yeast to effect the fermentation. As stated, these differences materially distinguish sake from all malt brewery beverages. Note in particular, that riboflavin in sake, absent any lactic acid bacterial infection, does not pose off-flavour development problems such as those which are typically associated with hopped malt-containing products, such as beer.

The role of light in the production of hopped malt beverages, and especially in brewing, has received a great deal of attention, and it is generally accepted as axiomatic that in malt brewery beverages, especially those of an alcoholic nature, photochemical reactions produce accelerated aging, and in general will shorten a malt beverages shelf life and engender undesirable flavour development.

SUMMARY OF THE INVENTION

It has now been found, and this finding forms the basis of the present invention, that in the production of a hopped malt beverage, if riboflavin is substantially absent or present in a process liquid prior to hopping in only a relatively small or "insignificant" amount, then the resulting beverage has enhanced stability against light and less tendency to produce skunky off flavours.

The process liquid is produced in the usual manner from malt and will generally have a relatively high riboflavin content of about 0.4 ppm or more, in this specification riboflavin contents above 0.2 ppm being termed "high". In one embodiment of the process aspect of the present invention, a step is included which involves reducing, usually by decomposing, the riboflavin content to less than 0.2 ppm, that being considered herein an "insignificant" amount.

The present invention provides a hopped malt beverage having enhanced light stability, with the beverage comprising hopped processing liquid, which processing liquid had a riboflavin content of less than 0.2 ppm during hopping.

In another aspect, the invention provides a process for producing such product in which process the process liquid has a riboflavin of at least 0.2 ppm.

Very surprisingly, the light problem discussed above can, in a preferred embodiment, and even ironically, be part of the solution in that, in spite of the clearly counter-intuitive nature of the approach, the problem associated with riboflavin in process liquids can be reduced or eliminated by the deliberate and selectively timed use of selected type and amount of actinic radiation to treat any such process liquid prior to hopping. In a preferred embodiment therefore, it has also been found that the desired reduction in the amount of riboflavin may be effected by subjecting a riboflavin containing process liquid, prior to hopping, to the action of actinic radiation of a wavelength adapted to decompose riboflavin, the so-treated process liquid being finished, including being hopped, to product in the usual manner by conventional brewing procedures.

The amount and type of radiation must be sufficient to accomplish significant decomposition of the riboflavin, this, herein termed "effective amount", being readily determined by experiment.

The present invention has special application to the production of a beer having enhanced stability to light which can, in situations where incident light causes deterioration of the product, lead to an extended shelf-life, up to 25% or more than is normal for regular beer under similar conditions. This of course is an extremely important practical consideration.

In a preferred embodiment of the invention there is provided a process for the production of a beer wherein a process liquid is hopped to produce the desired beverage, the improvement comprising treating any process liquid having a high riboflavin content with an effective amount of actinic radiation having a wavelength greater than 300 nanometers and adapted to decompose riboflavin, where the riboflavin content is reduced to less than 0.2 ppm and the resulting beer has enhanced stability to light.

It is believed that reducing the amount of riboflavin to a relatively low level prior to hopping, prevents the formation of some of the "skunky" flavour-imparting sulphur compounds and hence is responsible for the enhanced light stability. Moreover, it has also been found that if, as is preferred according to the present invention, the amount of riboflavin is reduced prior to the fermentation stage of the brewing process, for example in the unhopped wort, the same beneficial result is achieved. This is very advantageous and very unexpected since, as indicated above, it has always been thought that significant amounts of riboflavin would be produced during fermentation and hence riboflavin elimination prior to fermentation would have been ineffectual from a practical viewpoint.

It is preferred that at least 90%, more preferably 95% and especially practically substantially all of the riboflavin is removed from the process liquid prior to hopping although amounts in excess of 50% can be useful. In practice this means the process liquid, prior to hopping may, if wort, have a maximum riboflavin content of say less than 0.20 ppm, preferably less than 0.1 ppm and especially less than 0.05 ppm, and when a fermented liquid, less than 0.15 ppm, preferably less than 0.10 ppm, especially less than 0.07 ppm and most especially less than 0.03 ppm.

The desired hopped malt beverage is produced using generally well-known brewing procedures adapted where necessary, of course, to incorporate the required riboflavin reduction stage, preferably light treatment of the present invention at an appropriated stage. Consequently, an all-malt or a malt plus adjunct combination may be used as starting substrate as desired.

In this specification, "process liquid" means any unhopped wort or fermented wort (including green or bright beer) produced using malt.

In this specification "actinic light" is light of a predetermined wavelength which is capable of stimulating certain chemical reactions, and, in particular, the decomposition of riboflavin. Specifically, the desired radiation has a wave length greater than 300 nanometers but will generally be below 700 nanometers. It has been found advantageous to use light having a wavelength of greater than about 340 nanometers, since radiation below those ranges may adversely effect other components of the processing liquids causing their destruction and this has adverse effects on flavour. The desired results are obtained most efficiently with radiation whose wavelength is not greater than about 550 nanometers.

Consequently, actinic radiation used has a preferred range is from about 340 to 550 nanometers, advantageously from 350 to 500 nanometers, and especially from 410 to 450 nanometers. Use of light to decompose the riboflavin has the added advantage that it is familiar to and readily accepted as a natural treatment.

It may be noted that the desired radiation may be provided by commercially available lamps, and indeed, may preferably be provided by more efficient forms of those lamps which are usually responsible for the indoor production the "skunky" flavour in regular beer. In summary, it is preferred that visible light be used.

The actual amount or "dose" of radiation is not critical, provided it is sufficient to effect the desired decomposition or reduction of the riboflavin content resulting in the increase light stability. Standard tests for the determination of riboflavin content are available and may readily be used to confirm the desired reduction in riboflavin content has been achieved.

Regular North American beer when packaged in clear flint glass, green glass or the like and subjected to strong light, eg. sunlight or artificial light indoors, can develop an unacceptable skunky flavour within a matter of minutes—quite often within twenty minutes. The skunky flavour is readily discernable by experienced taste panellists who routinely make quality control evaluations in beer products. Using such panels, the alcoholic brewery beverages of the present invention have been found not to develop the same degree of skunky flavour for at least twenty (20) hours and, in fact, for as long as sixteen (16) or even as long as thirty (30) hours or more.

In the traditional manner, hops or hop pellets are generally used to ensure the "traditional" beer taste is obtained. Although there is a small amount of riboflavin in hops and hop pellets, it is insignificant as taught herein. However, if desired even that small riboflavin content could be removed if desired. Moreover, hop extracts may be substituted for the hops or hop pellets and such extracts do not contain any riboflavin and hence these may be used to advantage in the present invention. Also, the yeast pitched to commence fermentation may include some small amount of riboflavin, but again this should not be sufficient to adversely affect the present invention. However, it would be advantageous to use a yeast which is substantially free of riboflavin and/or is riboflavin deficient.

The decomposition of the riboflavin proceeds faster at elevated temperatures. Consequently, it is preferred to treat the wort as soon as it exits the mash tun, its temperature at that point being as high as 90 degrees C. This has the additional benefit of ensuring the clarity of the wort with no trub formation, factors which assist treatment with light.

It has also been found that the desired decomposition of the riboflavin is hindered by the presence of oxygen in the process liquid and hence reduced levels of oxygen are preferred, with substantially anaerobic conditions being especially preferred.

The dose rate is not critical, although higher rates are preferred to minimize the time required to effect the light treatment stage, especially when the process liquid is being treated in a continuous process.

The present invention will be further described, but not limited, through reference to the appended Figures.

DETAILED DESCRIPTION OF A PREFERRED EMBODIMENT

Figure 1:
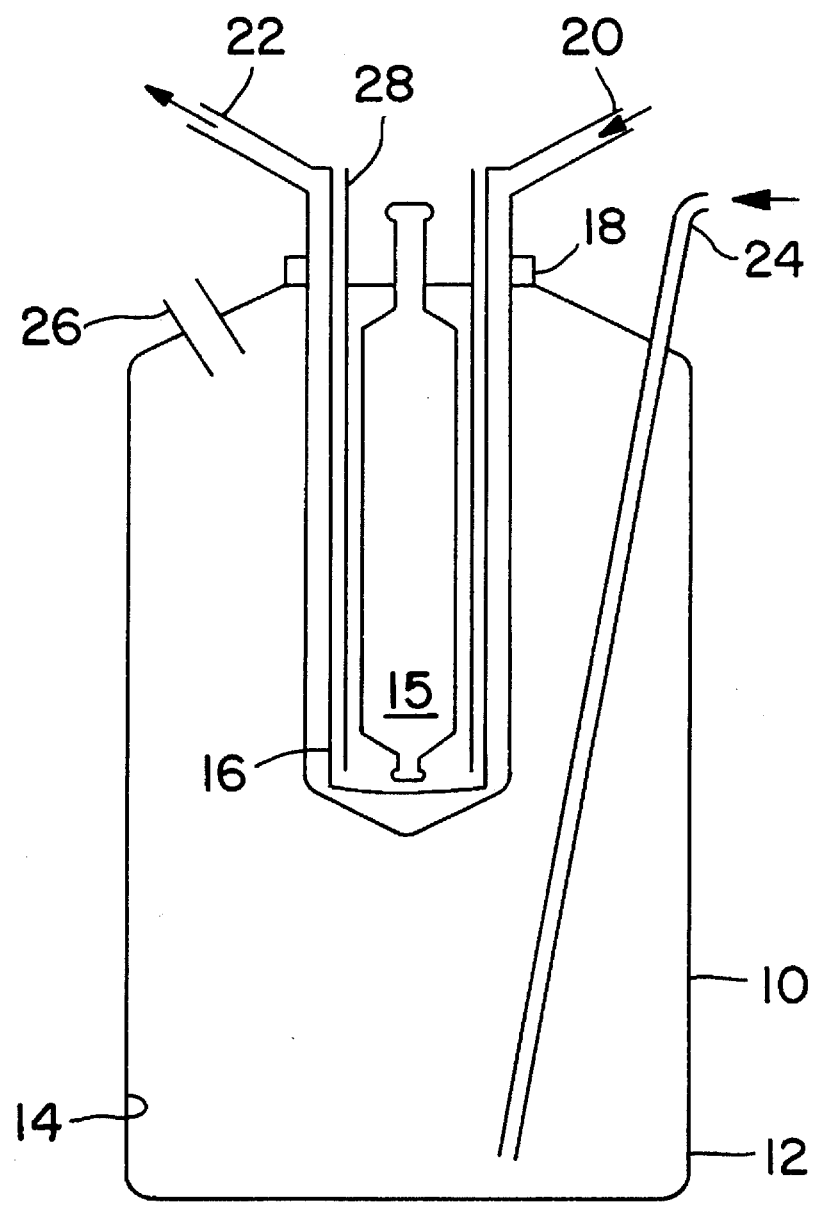
FIG. 1 is a simple diagrammatic cross-section through a pilot scale reactor suitable for the batch irradiation of liquids.

Turning to FIG. 1, a 35 liter reactor, generally designated 10 comprises a circular housing 12 having an interior reflective surface 14. Extending down along the central axis of the housing is a 450 watt medium pressure mercury vapour lamp 15, Hanova lamp (Ace Glass Inc. #7825), the lamp being secured in position in its housing 16 which itself is secured to the vessel lid 18. The housing 16 also includes circulation means for circulating a heating/cooling fluid, which enters via port 20 and exits via port 22. Surrounding lamp 15 is an uranium glass filter (Ace Glass #7835-46—not shown) which cuts off light with wavelengths of 360 nanometers or less. The radiative power of this light corresponds to approximately 10.1% of the lamp power. The reactor is also provided with a tube 24 through which a gas such as nitrogen, can be introduced into the reactor adjacent the interior base and a port 26 to allow the gas to vent following it carrying out a sparging action in the body of the liquid in the reactor. Mechanical stirring means (not shown) can be placed in the reactor to provide additional stirring if necessary or the sole stirring action if desired.

Figure 2A:
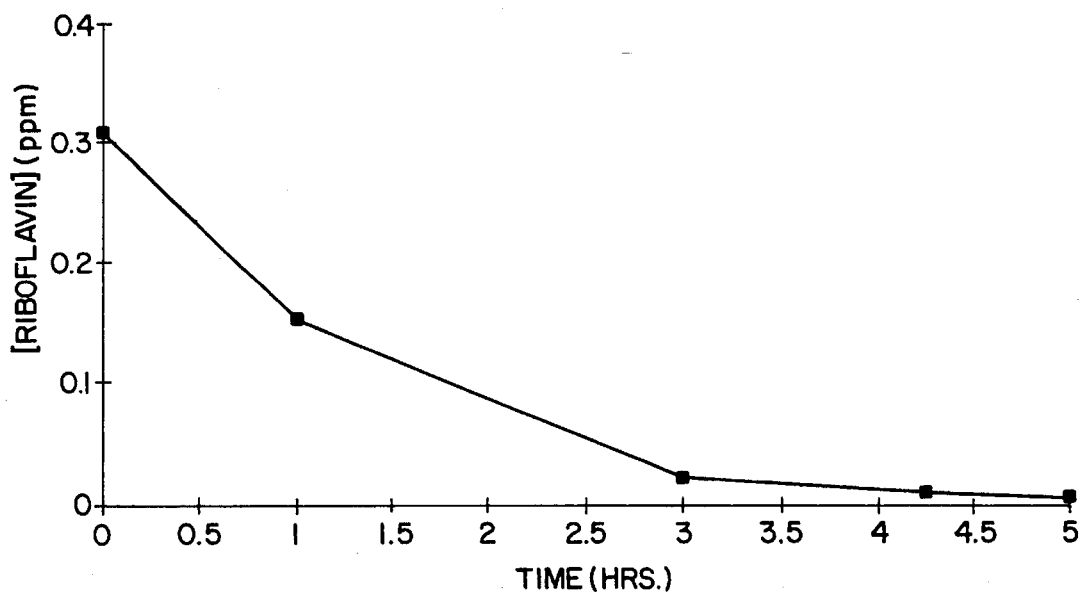
FIGS. 2a and 2b are graphs showing the elimination of riboflavin from an unhopped wort under the influence of actinic radiation.

Unhopped (sweet) wort from the Applicant's regular lager production at its London plant was kept at an elevated temperature (70 degrees C.) until it was transferred to the batch scale reactor 10 shown in FIG. 1. Silicon anti foam was added (0.3 mL) and the wort purged with nitrogen which also generated turbulent mixing. After 25 minutes of sparging to reduce oxygen content, irradiation of the agitated wort commenced. The effect of the irradiation was monitored by evaluation of riboflavin concentration by an HPLC method similar to that described by W. Moll, in Fronteirs of Flavour, Proceedings of the 5th International Flavour Conference, Porto Kerras, Chalkidiki, Greece, 1–3 Jul. 1987. FIG. 2a shows the loss of riboflavin in the wort. The loss of riboflavin ($R_b$) appears to follow approximately first order kinetics—that is:

$$\frac{-d[R_b]}{dt} = k[R_b]$$

where k is the pseudo first order rate constant and varies with temperature, lamp power output, oxygen content and reactor design.

Note that riboflavin does not appear to be photo-catalytic, since it is consumed in the photo-production of the off-flavour thiols. Thus, low residual levels of riboflavin can, to some degree, be tolerated without unduly compromising the flavour of the beer, such low levels of riboflavin, which can be readily determined experimentally using the taste panel route, are referred to herein as being "insignificant amounts".

Figure 2B:
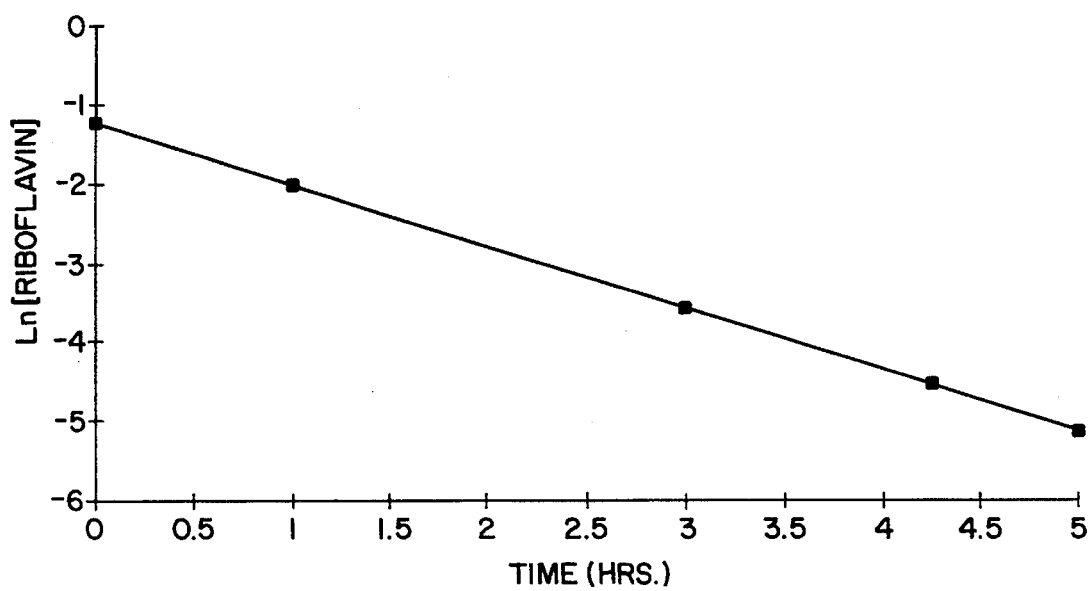

In this example the rate constant is given as the negative slope of the graph shown in FIG. 2b which is $-0.0129$ min$^{-1}$. Thus, in 300 minutes the riboflavin concentration had been depleted from 0.31 ppm to 0.007 ppm or by approximately 98%. If required, the theoretical energy requirements required can readily be calculated and this may provide some guidance in selecting optimal equipment and light processing conditions.

Figure 3:
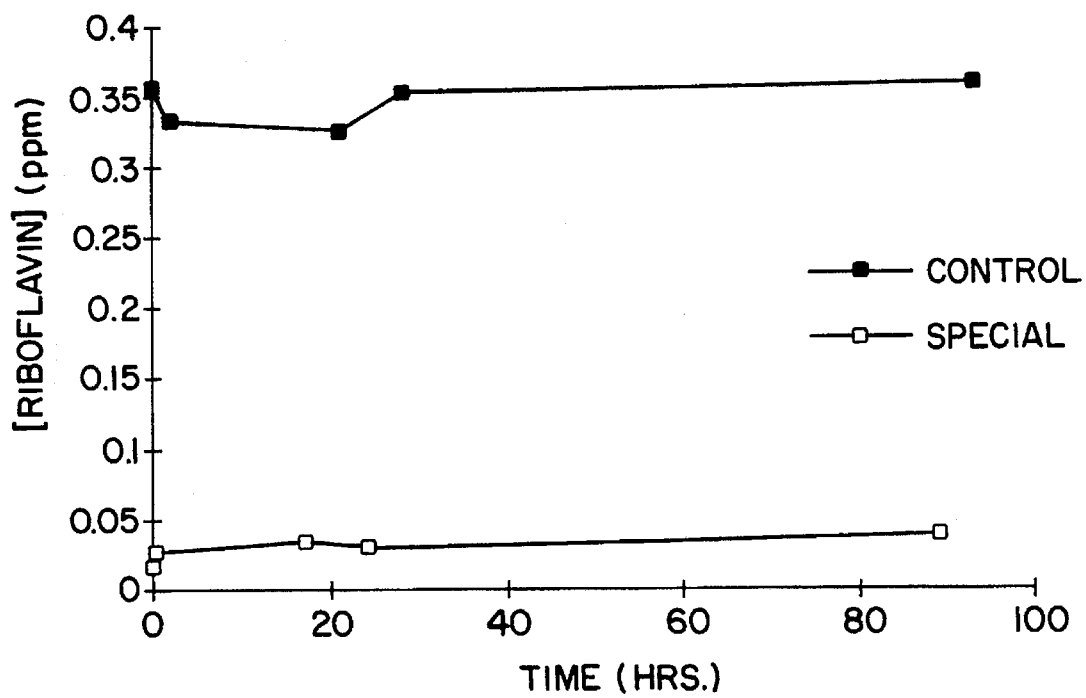
FIG. 3 is a graph showing the concentration of riboflavin during the fermentation of light-treated wort and untreated wort as the control.

The wort treated in accordance with the invention as well as a 35 L batch of the standard untreated wort as control were then each brewed to produce a beer according to standard pilot plant procedure, Riboflavin concentrations were measured at strikeout (0.019 ppm) and after pitching (0.027 ppm) with a standard lager yeast grown in synthetic media and washed twice with distilled water. As can be seen, riboflavin concentration increased slightly, presumably because of riboflavin present in the pitched yeast and in the hops, and the fermentations were monitored: the results are given in FIG. 3. At dropping, the riboflavin concentration was 0.070 ppm for the treated wort and 0.395 ppm for the control. The finished beer produced using wort treated according to the present invention, possessed a riboflavin concentration of 0.032 ppm (13% relative to control) and of 0.25 ppm for beer produced from untreated wort.

The treated and control beers were bottled in flint glass and oxygen was carefully excluded on sealing. The beers at 4 degrees C. were then evaluated for light stability by irradiating the bottles with visible (actinic) light from a 100 watt tungsten filament light bulb located at a distance of 20 cm. The beers were irradiated for the various times given in the Table below and then evaluated by experienced panellists. The results represent the average evaluations recorded by the panellists, the terms used describing the degree of skunky flavour observed, "strong" indicating unacceptable and "trace", meaning still acceptable.

| Time Irradiated (hours) | Control Beer | Treated Beer |
| --- | --- | --- |
| 2 | strong | none |
| 4 | strong | trace |
| 8 | strong | trace |
| 16 | strong | trace |

As can be seen from the table, the beer produced without light treatment according to the present invention exhibited a strong, ie unacceptable skunky flavour within less than two hours of irradiation whereas the beer made utilizing the present invention exhibited only a trace of skunky flavour and was still acceptable even after it had been irradiated for over sixteen hours. In repeat experiments, irradiation for periods in excess of twenty hours produced the same effect. These results clearly indicate that the beer produced according to the present invention has enhanced light stability.

Figure 4:
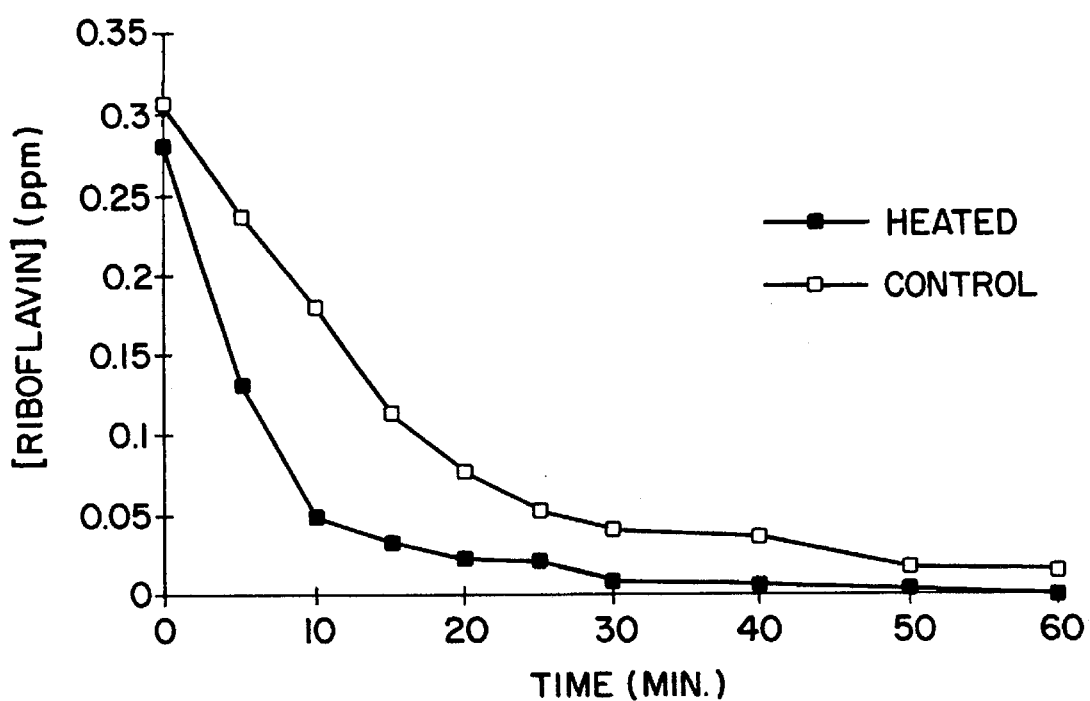
FIG. 4 is a graph showing the rate of destruction of riboflavin in wort by light treatment at two different temperatures.

The photochemical decomposition of riboflavin proceeds faster at higher temperatures, as is demonstrated by the photolysis of wort containing riboflavin at different temperatures—refer to FIG. 4. In this test 1 liter of normal production unhopped sweet wort was heated to 70 degrees C. then irradiated. A second liter of the same wort was irradiated at a control temperature of 20 degrees C. As is clearly demonstrated, the rate of destruction of riboflavin is greatly increased at the higher temperature.

Figure 5:
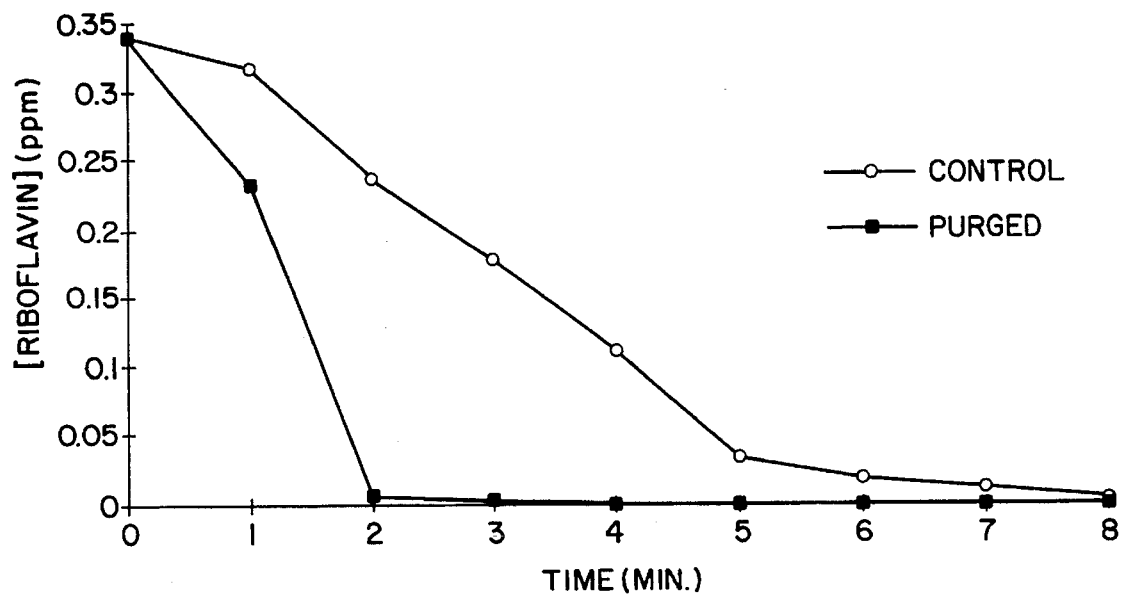
FIG. 5 is a graph showing the difference in the rate of destruction of riboflavin by the light treatment in aerobic and anaerobic conditions; and, FIG. 6 is a graph showing the effect of increasing the dosage rate of the light treatment on the destruction of riboflavin in model solutions by using a reflective foil.

To demonstrate the desirability of excluding oxygen from the process liquid during the irradiation step, two similar aqueous riboflavin solutions at buffer pH 4, only one solution being prior purged with helium for thirty minutes to remove any dissolved oxygen, were each irradiated. The results are shown in FIG. 5. As can be seen, destruction, i.e. reduction or even elimination of riboflavin, was achieved much sooner in the purged solution, clearly showing the desirability of reducing or even practically eliminating oxygen from process liquids being light treated according to the present invention.

Figure 6:
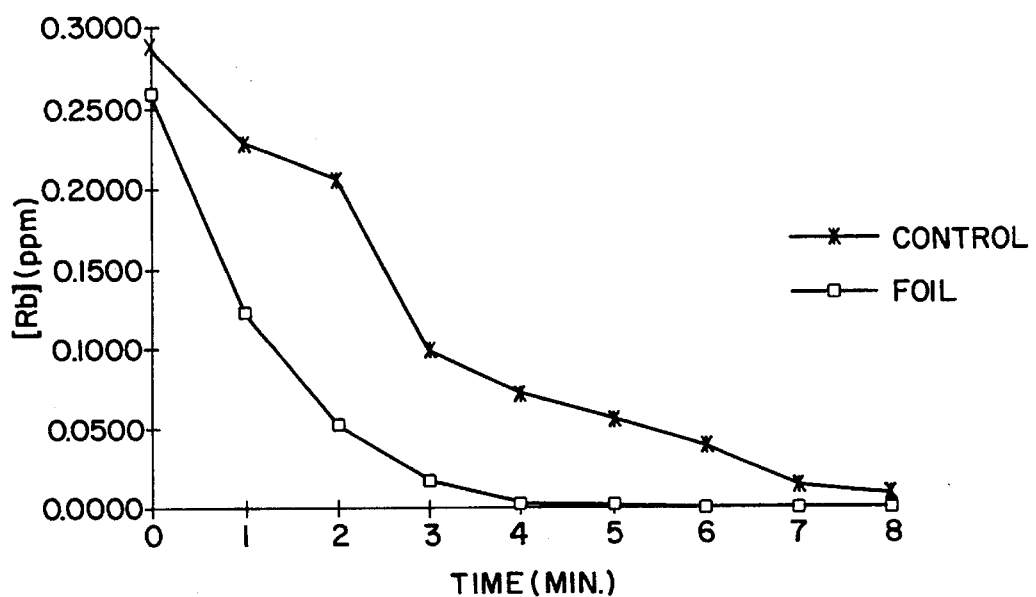

The reactor design is made more efficient by including a reflective inner surface 28 (refer FIG. 1) which reflects light which is not immediately or directly absorbed and thereby increases the effective dosage rate. This effect is demonstrated by reference to FIG. 6 in which two 300 mL solutions of riboflavin each in a Ph 4 buffer, were irradiated—one solution when the reflective foil in place around the container and the other one when not. As can be seen, the rate of elimination of riboflavin is effectively increased by a factor of 3 by use of the reflector system.

I/We claim:

1. A hopped malt beverage having enhanced light stability, said beverage comprising hopped process liquid, which process liquid had a riboflavin content of less than 0.2 ppm during hopping.

2. A hopped malt beverage having enhanced light stability, said beverage comprising hopped wort, which wort had a riboflavin content of less than 0.1 ppm during hopping.

3. A hopped alcoholic malt beverage having enhanced light stability, said beverage comprising a hopped and fermented wort, which wort had a riboflavin content of less than 0.1 ppm during hopping.

4. A beverage as claimed in claims 1,2 or 3 in which said riboflavin content was less than 0.07 ppm.

5. A beverage as claimed in claims 1,2 or 3 in which said riboflavin content was less than 0.03 ppm.

6. In a process for the production of a hopped malt beverage having enhanced light stability from a process liquid, the improvement comprising hopping a process liquid having a riboflavin content of less than 0.2 ppm.

7. A process for the production of an alcoholic hopped malt beverage wherein a process liquid is hopped and fermented, the improvement comprising hopping a process liquid having a riboflavin content of less than 0.1 ppm, whereby an alcoholic malt beverage having enhanced light stability is obtained.

8. The process as claimed in claim 7, wherein said riboflavin content is less than 0.1 ppm.

9. The process as claimed in claim 7, wherein the riboflavin content is less than 0.07 ppm.

10. The process as claimed in claim 7, wherein the riboflavin content is less than 0.03 ppm.

11. The process as claimed in claim 7 in which the process liquid is wort.

12. In a process for the production of a beer wherein a process liquid is hopped to produce the desired beverage, the improvement comprising treating a process liquid for producing a beer having a high riboflavin content with an effective amount of actinic radiation having a wave length greater than 300 nanometers and adapted to decompose riboflavin, wherein the riboflavin content is reduced to less than 0.2 ppm and the resulting beer has enhanced stability to light.

13. The process according to claim 12 in which the said process liquid is wort.

14. The process according to claim 13 wherein the riboflavin content is reduced to less than 0.1 ppm.

15. The process according to claim 14 wherein the riboflavin content is reduced to less than 0.07 ppm.

16. The process according to claim 14 wherein the riboflavin content is reduced to less than 0.03 ppm.

17. The process according to claim 12 wherein the actinic radiation has a wavelength of from 300 to 700 nanometers.

18. The process according to claim 17 wherein the actinic radiation has a wavelength of form 340 to 550 nanometers.

19. The process according to claim 18 in which the actinic radiation has a wavelength of from 410 to 450 nanometers.

20. The process as claimed in claim 12 wherein the process liquid is substantially anaerobic during said treatment with the actinic radiation.

21. The process as claimed in claim 12 wherein the process liquid is maintained at a temperature of from about 25 degrees C. to 90 degrees C. during said treatment with actinic radiation.

22. The beer produced by the process of claim 12.

* * * * *